E. L. HUTCHINSON.

Corn-Shellers.

No. 5,994. Reissued Aug. 4, 1874.

WITNESSES:

P. C. Dieterich

Fred Kreischer

INVENTOR:

E. L. Hutchinson per. T. H. Alexander

ATTORNEY.

THE GRAPHIC CO. PHOTO-LITH. 39 & 41 PARK PLACE, N.Y.

UNITED STATES PATENT OFFICE.

EDWIN L. HUTCHINSON, OF AUBURN, NEW YORK.

IMPROVEMENT IN CORN-SHELLERS.

Specification forming part of Letters Patent No. 141,559, dated August 5, 1873; reissue No. 5,994, dated August 4, 1874; application filed May 29, 1874.

*To all whom it may concern:*

Be it known that I, EDWIN L. HUTCHINSON, of Auburn, in the county of Cayuga and State of New York, have invented certain new and useful Improvements in Corn-Shellers; and I do hereby declare that the following is a full, clear, and exact description thereof, references being had to the accompanying drawings, and to the letters of reference marked thereon, which form a part of this specification.

My invention relates to that class of corn-shellers wherein the ears of corn are presented to one end of a revolving shelling-wheel, and are shelled by being operated upon by teeth on the periphery of the wheel engaging with the ear and pressing it against a fixed bar, causing the ear to revolve and forcing it along in the direction of the axis of the wheel and across the line of the motion of the teeth, and discharging the cob at the other end of the wheel.

Figure 1:
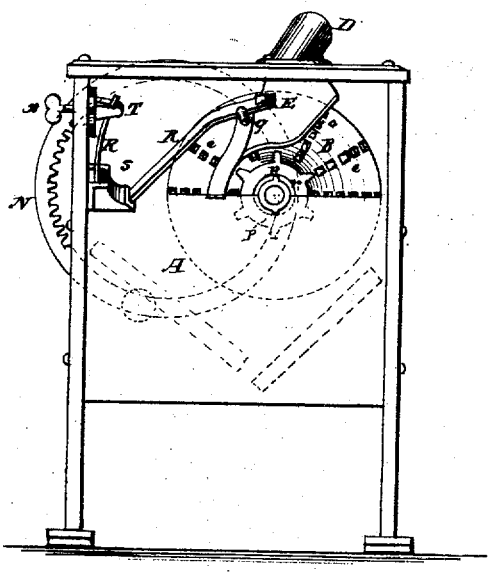
Figure 2:
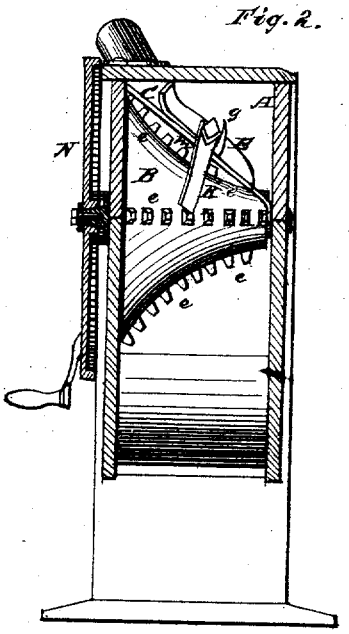
Figure 3:
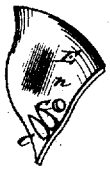
Figure 5:
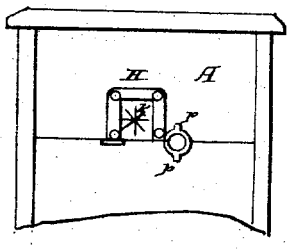
Figure 4:
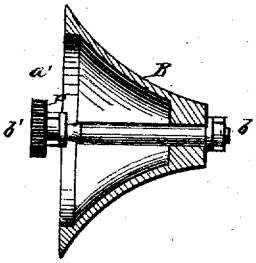

In the accompanying drawing, Figure 1 is a side elevation of my machine, with a part of the side removed. Fig. 2 is a transverse vertical section of the machine. Figs. 3, 4, 5, and 6 are views of detached parts of the same.

A represents the outside of a suitable frame or box, which supports and incloses the working parts. The two end standards of this frame are made with grooves, into which the ends of the sides fit, the frame being held together by bolts. B represents the improved shelling-wheel, made in the shape of a frustum of a cone, and concave on the shelling-surface.

For a machine of full size for use I make the larger end of the shelling-wheel about fourteen inches and the smaller end about five inches in diameter, and about six inches in length on its shelling-surface. A wheel of about these relative proportions I find preferable.

The fixed guide-bar C must be made straight and without any teeth or projections on its side, *m*, against which the ears are pressed in the operation of shelling, and it should be placed at an angle of about forty-five degrees with the axis of the shelling-wheel, and should not vary more than five degrees from this line, and be so arranged in relation to the shelling-wheel B that the ears will pass through the whole length of the guide-bar on a straight line, which is a far better way than when it has to follow a curved line partially around the wheel.

Figure 6:
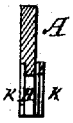

E is a yielding cap attached to a spring, R, and is designed to hold the corn against the teeth of the wheel while being shelled. *e e* represent the teeth on the shelling-wheel. The cap E on its under side corresponds with the circular form of the shelling-wheel, and it also has a curve outward at its upper end to admit the ears of corn, and near its lower end it is provided with one or more projections, *c*, extending across the cap on its under surface and to stand out from its surface. These projections are to prevent the ears from passing through too rapidly and without being shelled. The lower end of this cap, beyond the projections, is also made with an outward curve, as the cob, after it has passed by the projections, passes out of the machine more readily by being pressed against this curved form. The cap E, in addition to its curved form described, should extend to the lower end of the shelling-wheel; otherwise, the teeth will throw up the lower end of the cob so it will not take the right direction to pass out of the machine; and the cap must be made wide enough so that one line of teeth on the shelling-wheel will not pass the surface *m* of the fixed guide-bar C before the following line of teeth shall have come under the edge of the cap farthest from the guide-bar. In this way the ears are prevented from escaping sidewise from under this cap, and the cap must extend along the whole length and parallel to the surface *m* of the guide-bar C. The spring R is held in position by pieces S and T. The piece S acts as a center, around which R springs, and from which as a center it is caused to spring in the desired direction. The piece T acts as a guide to the upper end of the spring, and also as a nut for a set-screw, *x*, which gives the proper tension to the spring. The guide-bar C has a standard, *g*, against which the spring R slides, and which acts as a guide for the spring. D is the spout through which the ears of corn are fed to the machine. The spout should be on a line, or nearly on a line, with the guide-bar C. The opening H is provided with two elastic curtains, *k k*, made of rubber, leather, or other suitable elastic material, which are divided so as to permit the cob to pass out, and will then spring into position and close the opening. The first curtain will stop or change the direction of the shelled corn so it will fall into the opening between the two curtains, or be stopped by the second curtain and fall through the opening into the box, as shown in Fig. 6.

To separate the shelled corn from the cob, it is essential that the ears shall not follow each other so closely that there will not be time for the curtains, or one of them, to close before the following ear or cob reaches it. Inasmuch as the teeth of the smaller end of the wheel move slower, the cob would also at this point move through slower if the cap E had the same angle its entire length, and the cob would be overtaken by the following one and forced through the curtain without giving it time to close before the following ear reached it. To prevent this, the cap E is provided with the projections *c c* near its lower end, and below the projections it is made with a curve outward. The cob having passed this projection, and being forced by the teeth of the wheel against this lower curve, its motion and force are accelerated so as to pass it quickly through the curtains, and the projections on the under side of the cap have the effect to stop, to some extent, the following ear or cob, giving time for the preceding cob to pass the curtains, or one of them, and allow the curtain to close before the following cob reaches it. I have found by experience that two curtains, with the curved cap E, are necessary to the successful operation of separating.

The conical shelling-wheel B is hung on suitable bearings, and is run by applying the power by means of a crank direct to the shaft of the wheel, or gearing may be used, as shown.

When it is designed to use the machine to separate the shelled corn from the cobs, in addition to shelling it, it is essential that the shelling-wheel shall be entirely inclosed except the necessary openings to admit the ears and discharge the shelled corn and cobs, and that the opening to admit the ear shall be at the larger end of the wheel and outside the line of the motion of the teeth, and the opening at the small end of the wheel, to discharge the cobs, also being beyond the line of motion of the teeth, and another opening below the shelling-wheel to allow the shelled corn to pass from the box. If any opening in the box is made within the line of the motion of the teeth, the shelled corn is sure to fly out at such openings; and hence the necessity, to a successful operation of the machine as a sheller and separator, that these parts shall be arranged as described.

The ears of corn are fed in at the spout D, at the larger end of the shelling-wheel B, and slide down the spout to the teeth *e e*, which grasp the ears and carry them against the guide-bar C, and pass them in an advancing and rotary motion through the machine, the cob passing through the curtains in the opening H, and the shelled corn falling through the opening below the wheel.

I am aware that elastic curtains have before been used in corn-shellers; therefore I make no claim to them as separate devices.

Having thus fully described my invention, what I claim as new, and desire to secure by Letters Patent, is—

1. The combination of the shelling-wheel B and fixed guide-bar C, and the yielding cap E, made in the curved form described, and provided with projection *c* on its under surface, all arranged and operating substantially as described.

2. The conical-shaped shelling-wheel B and fixed guide-bar C, and yielding cap E, provided with projections *c* on its under side and made in the curved form described, in combination with the elastic curtains *k k*, all arranged and operating substantially as set forth.

3. The guide-bar C, having the standard *g*, for the purposes herein set forth.

4. The combination, with spring R, arranged to control the cap E, of the central supporting-piece S, piece T, and adjusting-screw *x*, substantially as set forth.

In testimony that I claim the foregoing as my own I affix my signature in presence of two witnesses.

E. L. HUTCHINSON.

Witnesses:
T. H. ALEXANDER,
WARREN GALE.